Figure 4:
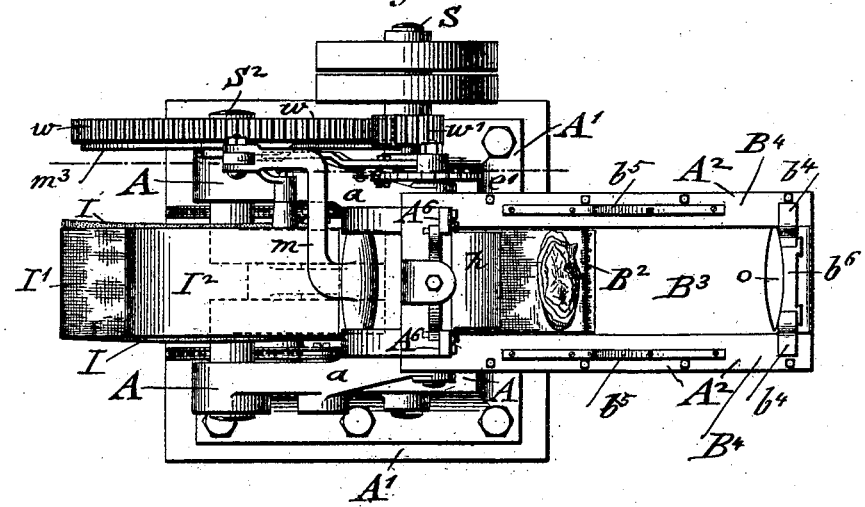

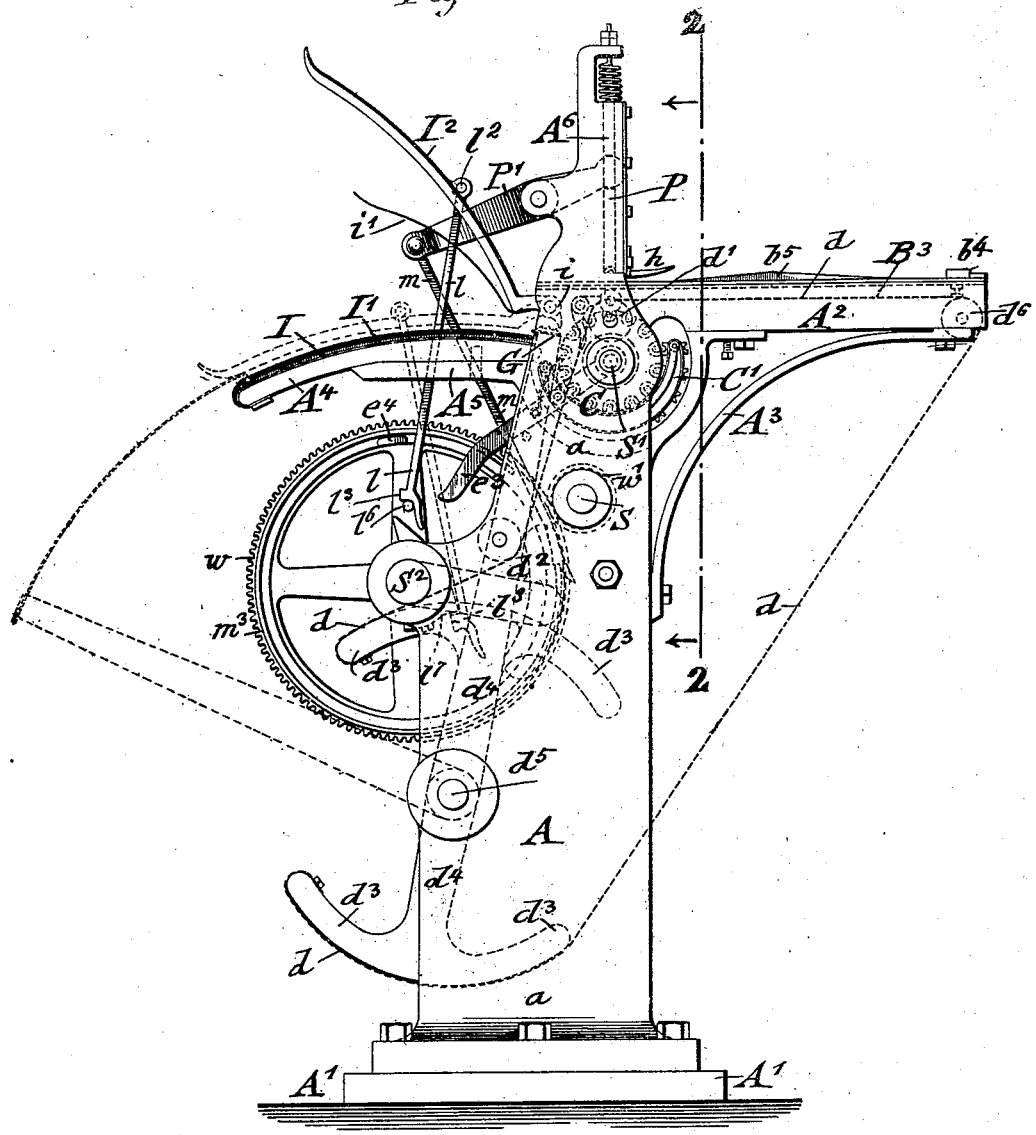

No. 705,872. Patented July 29, 1902.
H. A. SCHNEEKLOTH.
CIGAR MACHINE.
(Application filed Mar. 27, 1901.)
(No Model.) 8 Sheets—Sheet 2.
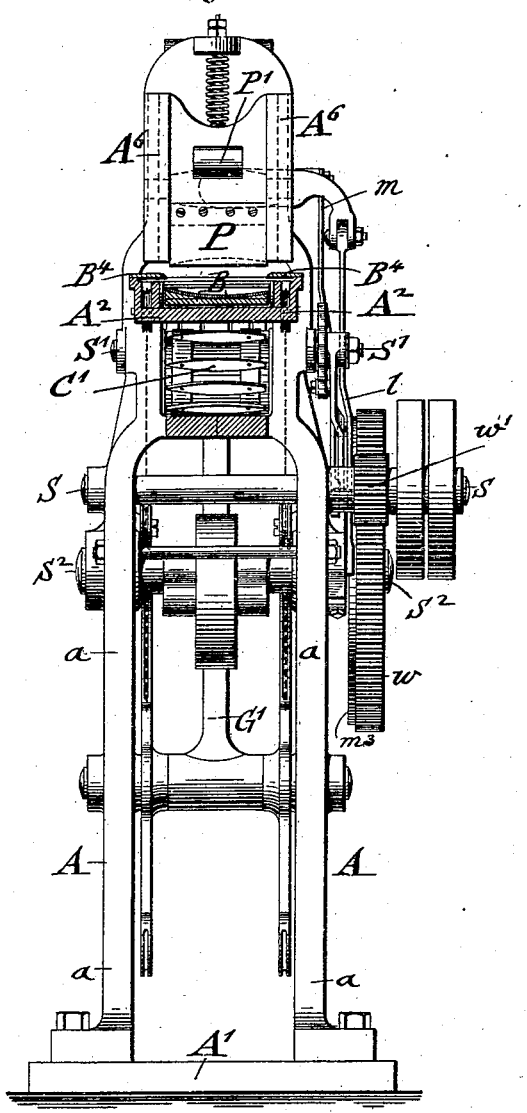
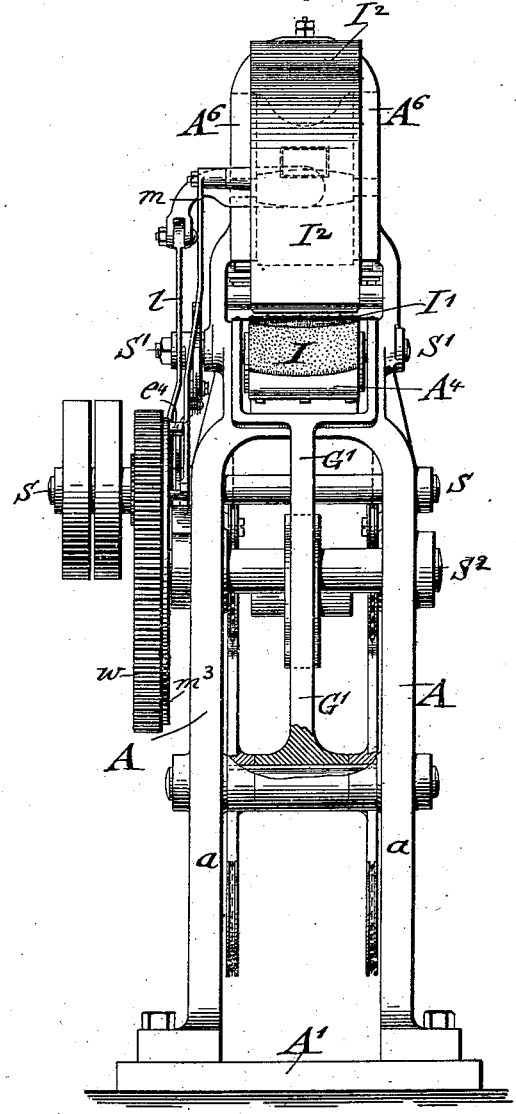
WITNESSES:
John A. Rennie
Walter Woelheim
INVENTOR
Hans A. Schneekloth
BY
ATTORNEYS.
THE NORRIS PETERS CO., PHOTO-LITHO., WASHINGTON, D. C.

No. 705,872. Patented July 29, 1902.
H. A. SCHNEEKLOTH.
CIGAR MACHINE.
(Application filed Mar. 27, 1901.)
(No Model.) 8 Sheets—Sheet 3.

WITNESSES:
John A. Rennie
Walter Wallheim

INVENTOR
Hans A. Schneekloth
BY
ATTORNEYS.

No. 705,872. Patented July 29, 1902.
A. SCHNEEKLOTH.
CIGAR MACHINE.
(Application filed Mar. 27, 1901.)
(No Model.) 8 Sheets—Sheet 4.
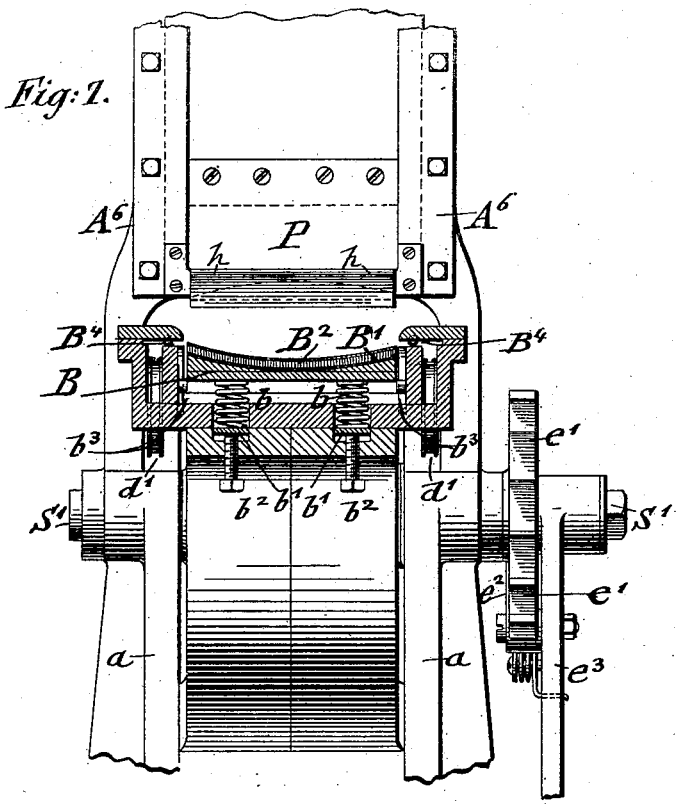
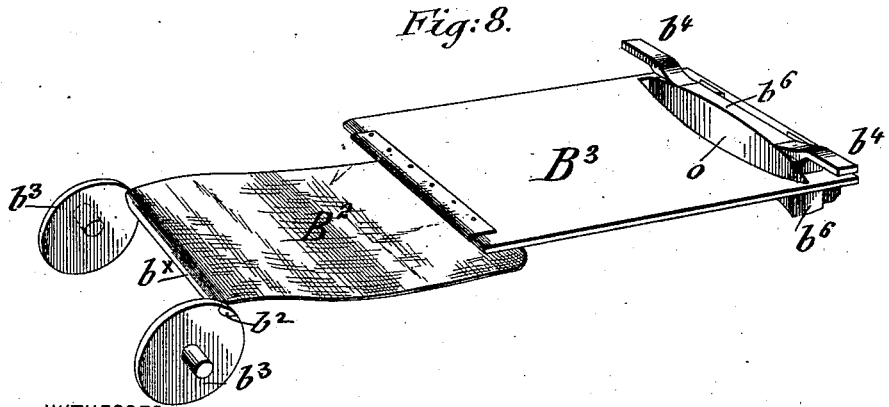
WITNESSES:
John A. Rennie
Walter Wollheim
INVENTOR
Hans A. Schneekloth
BY
ATTORNEYS No. 705,872. Patented July 29, 1902.
H. A. SCHNEEKLOTH.
CIGAR MACHINE.
(Application filed Mar. 27, 1901.)
(No Model.) 8 Sheets—Sheet 5.
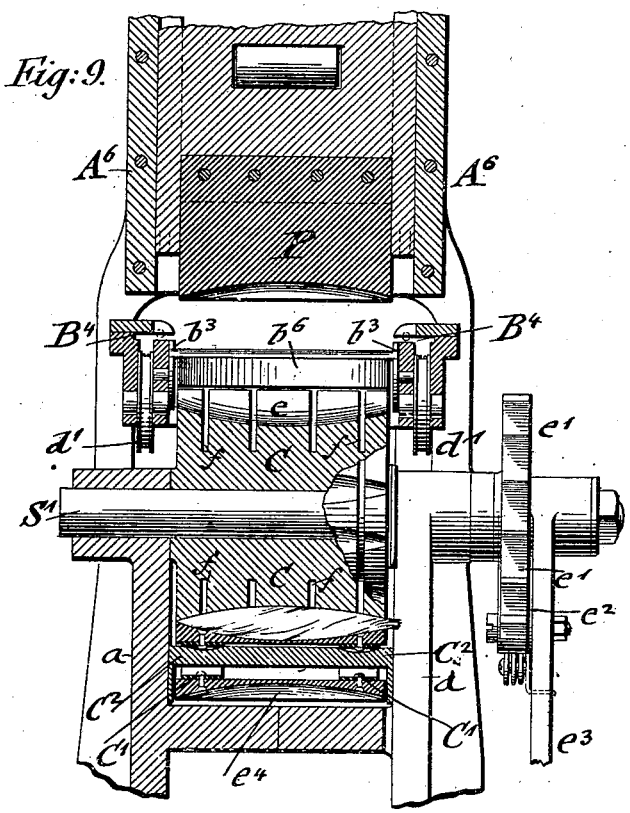
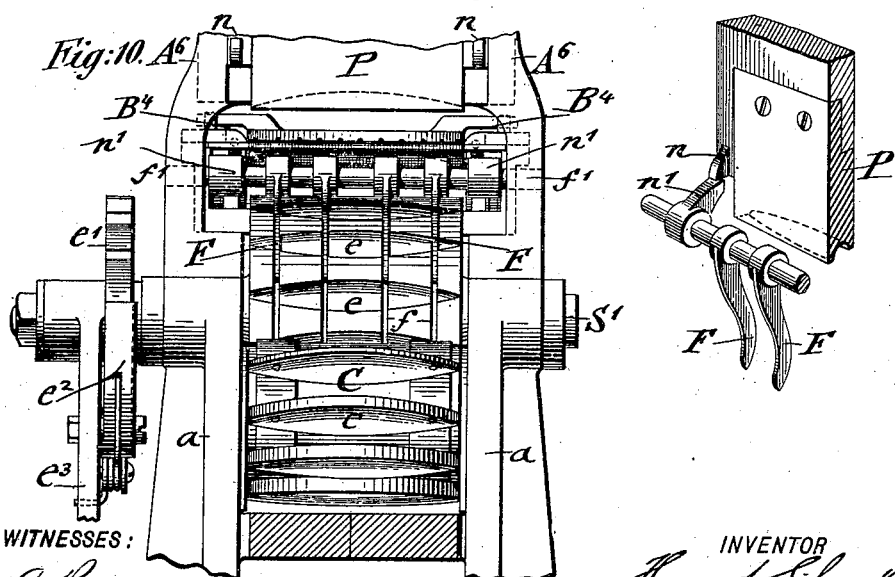
WITNESSES:
John A. Renner
Walter Wattheim
INVENTOR
Hans A. Schneekloth
BY
Jochel & Wahle
ATTORNEYS.

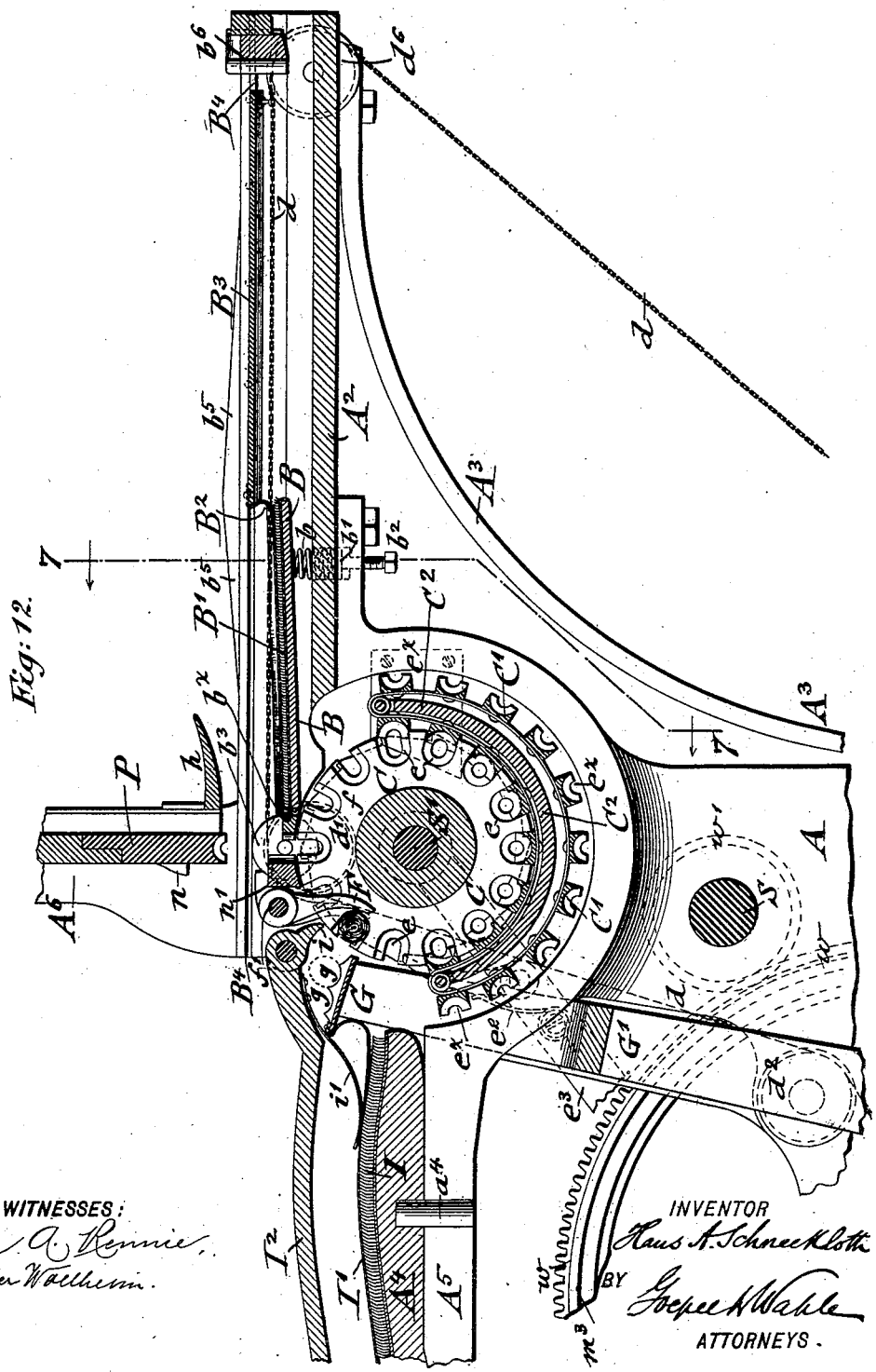

No. 705,872. Patented July 29, 1902.
H. A. SCHNEEKLOTH.
CIGAR MACHINE.
(Application filed Mar. 27, 1901.)
(No Model.) 8 Sheets—Sheet 7.

WITNESSES:
INVENTOR
Hans A. Schneekloth
BY
ATTORNEYS

UNITED STATES PATENT OFFICE.

HANS A. SCHNEEKLOTH, OF NEW YORK, N. Y.

CIGAR-MACHINE.

SPECIFICATION forming part of Letters Patent No. 705,872, dated July 29, 1902.

Application filed March 27, 1901. Serial No. 53,072. (No model.)

*To all whom it may concern:*

Be it known that I, HANS A. SCHNEEKLOTH, a citizen of the United States, residing in New York, borough of Manhattan, in the State of New York, have invented certain new and useful Improvements in Cigar-Machines, of which the following is a specification.

This invention relates to certain improvements in cigar-machines of that class in which the bunch is first formed and then rolled into the wrapper by two successive operations; and the invention consists of a cigar-machine which comprises the following instrumentalities: first, a yielding bunch-rolling table, a reciprocating slide-plate guided in stationary ways and adapted to be moved over said rolling-table, a rolling-apron connected with the front end of the slide-plate and with centrally-pivoted disks, said rolling-apron being supported on the yielding rolling-table while the filler is rolled in the binder, so as to form the bunch. The bunch is then transferred by a vertically-reciprocating plunger into one of the pockets of a mold-cylinder and transmitted by the same with the assistance of the endless mold-carrying apron to the cigar-rolling mechanism.

The machine consists, further, of the bunch carrying and transferring mold mechanism and the mechanism for imparting intermittent rotary motion to the same; next, of means for transferring the bunches from the individual molds of the mold-cylinder and apron onto an oscillating shelf and from the same successively to a cigar-rolling mechanism, consisting of a rolling-table, rolling-apron, and guide-plate, so as to produce the rolling of the bunch into the wrapper, and the invention consists, lastly, of certain details of construction and combinations of parts, which will be fully described hereinafter and finally pointed out in the claims.

Figure 5:
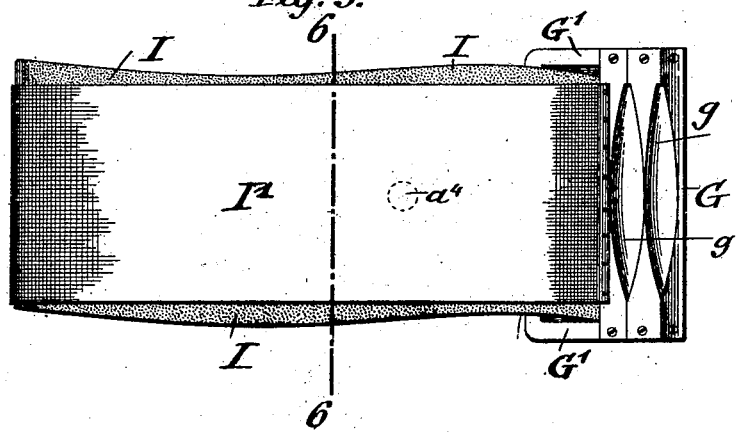
Figure 6:
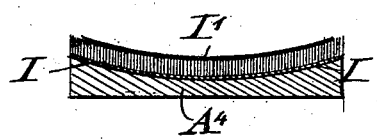
Figure 13:
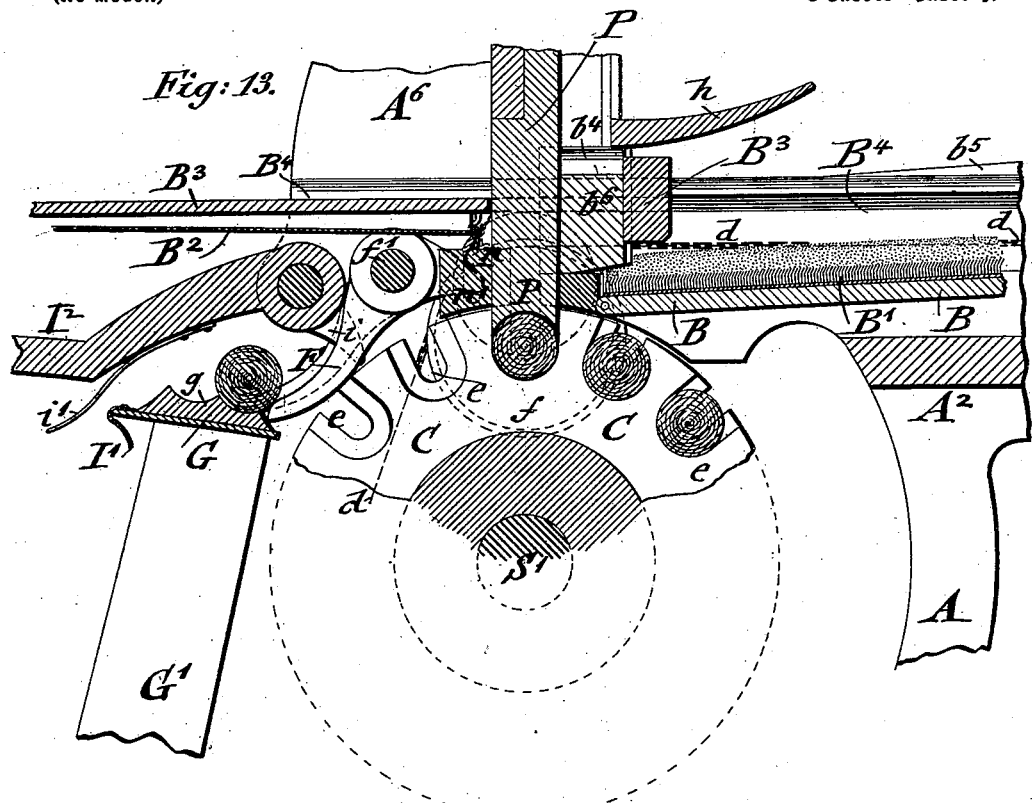
Figure 14:
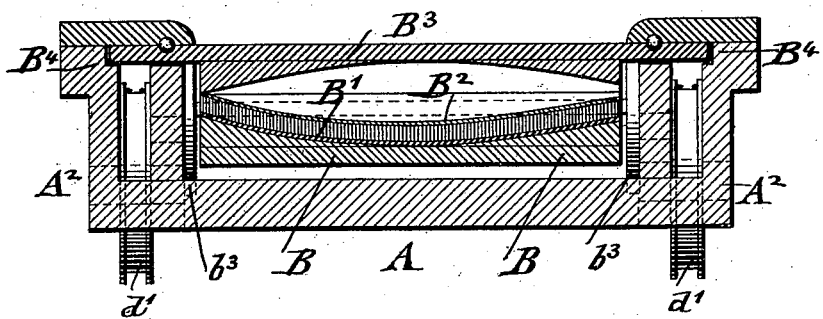
Figure 15:
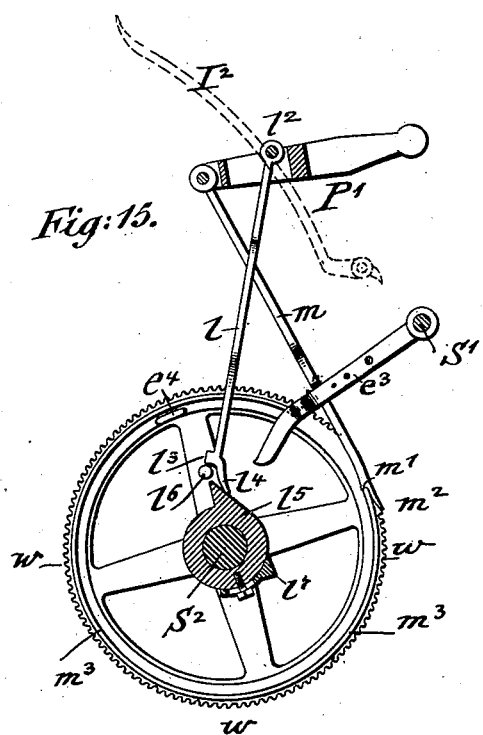

In the accompanying drawings, Figure 1 represents a side elevation of my improved cigar-machine. Fig. 2 is a rear elevation, partly in vertical transverse section, on line 2 2, Fig. 1. Fig. 3 is a front elevation with a portion broken away. Fig. 4 is a plan view of the machine. Fig. 5 is a plan view, drawn on a larger scale, of the cigar-rolling table. Fig. 6 is a detail vertical transverse section of the same on line 6 6, Fig. 5. Fig. 7 is a detail vertical transverse section, drawn on a larger scale, of the bunch-rolling mechanism. Fig. 8 is a detail perspective view of the bunch-rolling apron and slide-plate. Fig. 9 is a vertical transverse section, drawn on a larger scale, through the plunger, mold-cylinder, and bunch-mold-carrying apron. Fig. 10 is a detail front elevation of the mold-cylinder and the clearing-fingers for the bunches. Fig. 11 is a detail perspective view of the bunch-clearing fingers and of the mechanism for operating the same. Fig. 12 is a vertical longitudinal section through the bunch-rolling mechanism, mold-cylinder, and bunch-rolling devices drawn on a larger scale. Fig. 13 is also a vertical longitudinal section, drawn on a still larger scale than Fig. 12, showing the operative parts in position after a bunch is transferred from the bunch-rolling mechanism into one of the molds of the mold-cylinder. Fig. 14 is a detail vertical transverse section through the bunch-rolling mechanism, and Fig. 15 is a detail sectional side view showing the motion-transmitting mechanisms for the plunger and the guide-plate of the apron-rolling mechanism.

Similar letters of reference indicate corresponding parts.

Referring to the drawings, A represents the supporting-frame of the machine, which is composed of two upright cast-iron standards $a$ $a$, that are attached at their lower ends to a suitable base-plate A' and provided at the middle portion of the standard with a rearwardly-extending bunch-rolling table $A^2$, that is supported by suitable brackets $A^3$, and with a forwardly-extending curved cigar-rolling table $A^4$, that is supported on brackets $A^5$, as shown clearly in Fig. 1. The standards $a$ $a$ are extended above the rolling-tables $A^2$ and $A^4$, so as to form guideways $A^6$ for a verically-reciprocating and spring-suspended plunger P, that is arranged at the upper part of the main frame.

On the bunch-rolling table $A^2$ is supported the filler-rolling mechanism and on the curved forwardly-extending table $A^4$ the cigar-rolling mechanism, while intermediately between the bunch and cigar rolling mechanism is arranged an intermittently-rotating mold-cylinder C and an endless mold-carrying apron C'. The shaft of the mold-cylinder is located vertically below the plunger P, which cylinder takes up the bunches made by the bunch-rolling mechanism and transmits them in connection with the endless mold-carrying apron to the cigar-rolling mechanism.

*The bunch-rolling mechanism.*—The bunch-rolling mechanism is composed of a yielding rolling-table B, which is shown in Fig. 12 and which is pivoted at its front end to the horizontal table $A^2$ and supported at its rear end by helical cushioning-springs $b$, that are arranged in sockets of the table $A^2$ and supported on disks $b'$ at the ends of adjusting-screws $b^2$, so that the tension of the helical cushioning-springs can be adjusted as required. The upper surface of the yielding rolling-table B is preferably covered by a layer of carded leather made similar to the coverings of card-cylinders used in the manufacture of textile fabrics, the teeth or pins of the card-clothing being bent in the same direction, so as to yield more readily, said rolling-apron B and carded layer B' being concave in transverse section, corresponding to the shape of the cigars to be made on the machine. Over the carded layers of the rolling-table B extends a rolling-apron $B^2$, which is attached at its front end to a transverse cross-bar $b^\times$, that is supported by disks $b^3$, which are centrally pivoted to the supporting-frame, said cross-bar $b^\times$ acting in the nature of a crank on the disks, while the rear end of the rolling-apron $B^2$ is attached to the front end of a horizontally-reciprocating slide-plate $B^3$, that is concaved at the under side and guided by antifriction-balls in stationary ways $B^4$, supported on the table $A^2$, as shown in Figs. 12 and 14. The rear end of the horizontally-guided slide-plate $B^3$ is connected at both sides with operating-chains $d$ $d$, which are guided over suitable guide-pulleys $d'$ $d'$ and tension-pulleys $d^2$ to segments $d^3$, to which these are attached. The segments $d^3$ are supported by crank-arms $d^4$ on a transverse pivot-rod $d^5$ of the main frame, while a second pair of segments $d^3$ is supported on crank-arms extending diametrically to the crank-arms $d^4$ below the pivot-rod $d^5$, to which segments the opposite ends of the chains $d$ $d$ after they have been passed over guide-pulleys $d^6$ at the rear end of the supporting-table $A^2$ are supported, as shown in Fig. 1. The segments $d^3$ receive oscillating motion from a crank on the driving-shaft S, so that the slide-plate $B^3$ is moved forward by the chains in the guideways $B^4$ of the supporting-table $A^2$ by the upper segment and backward after the filler has been rolled into the binder by the lower segments and actuating-chains as the segments are moved alternately in one and then in opposite directions. The horizontally-reciprocating motion of the slide-plate $B^3$ under the influence of its actuating-chains takes place after the filler and binder have been placed on the rolling-apron $B^2$, that is supported on the carded surface of the yielding rolling-table B. The slide-plate $B^3$ is provided at its rear end with a transverse elongated opening $o$, in which is a vertically-guided stop-block $b^6$, that forms with the front edge of the opening $o$ a slot corresponding in shape to the bunch to be formed by the bunch-rolling mechanism, as shown in Fig. 8. Back of the opening $o$ the ends of the stop-block $b^6$ are provided with lateral lugs $b^4$, which extend over inclined guide-rails $b^5$, arranged on the guideways $B^4$ at both sides of the stationary table $A^2$, said inclined rails being made slanting in both directions and the highest points of the guide-rails being located vertically above the rear end of the rolling-table B, so that the slide-plate $B^3$ when it is moved in forward direction over the rolling-table is raised sufficiently by the lugs $b^4$ and inclined guide-rails $b^5$ and moved without being obstructed over the yielding rolling-table until its opening $o$ is located vertically below the plunger P. The block $b^6$ acts in the nature of a stop when the slide-plate $B^3$ arrives at its extreme forward position, with its opening $o$ vertically below the plunger P. The stop-block $b^6$ is guided by its dovetailed end in correspondingly-shaped grooves in the rear end of the slide-plate $B^3$, so as to move up and down in the same as required during the forward-and-backward motion of the slide-plate. When the slide-plate $B^3$ is returned to its normal position on the table $A^2$, the slide-block is likewise returned into its lower position on the guideways of the table, as shown in Fig. 12. When the slide-plate $B^3$ is moved in forward direction, the side lugs $b^4$ of the stop-block $b^6$ abut against the upper portion or guideway $A^6$ of the main frame A, as shown in Fig. 13, so that the face of the stop-block, as well as the opening $o$, is vertically below the plunger P. The side standards are provided with an upwardly-curved rearwardly-projecting heel or heels $h$, that serve to guide the lugs of the stop-block, so that the face of the latter and the bunch-shaped opening in the slide-plate are vertically in line with the plunger P and permit it to descend in downward direction through the opening $o$ for transferring the bunch formed and delivered by the bunch-forming mechanism into that pocket of the mold-cylinder which is at the time below the opening $o$. The vertically-guided stop-block $b^6$ is moved over the side rails of the table $A^2$ when not engaged by the inclined rails $b^5$.

*The bunch-transferring mold-cylinder.*—Below the plunger P and approximately on a level with the stationary table $A^2$ is located the mold-cylinder C, which is provided at its circumference with equidistant depressions or pockets $e$, that correspond in shape to the bunches. The shaft $S'$ of the mold-cylinder is supported in bearings of the standards of the main frame and intermittently rotated by a ratchet-wheel $e'$, keyed to the shaft and operated by a spring-actuated pawl $e^2$, applied to a lever $e^3$, that is operated by a short projecting cam $e^4$ on the gear-wheel $w$ of an auxiliary shaft S², as shown in Figs. 1, 3, 7, and 15, said cam engaging the lower end of the lever e³, so as to turn the ratchet-wheel e' for a distance of one tooth and bring thereby successively one pocket after the other below the plunger. The pawl-and-ratchet mechanism is operated once at each rotation of the driving and auxiliary shafts S S², so as to present at each forward motion of the slide-plate B³ a new pocket to the plunger P and the opening o at the rear part of the same. When the bunch formed by the bunch-rolling mechanism is transferred by the plunger into the pocket of the mold-cylinder which is at the time in position vertically below the plunger and the mold-cylinder is turned by its pawl-and-ratchet mechanism, the pocket thus filled is gradually moved into contact with and closed by a mold-section $e^x$, that is carried by the endless apron C', which is intermittently moved over an arc-shaped stationary guide-plate C², provided with rollers at both ends, as shown in Fig. 12. The mold-sections are applied equidistantly to the endless apron, the distance between them corresponding to the distances between the pockets of the mold-cylinder, so that the mold-sections close thereby the pockets and retain the bunches in the same during the intermittent rotary motion of the mold-cylinder wherein the bunches are retained under pressure and given the required shape. The mold-cylinder shown in the drawings is arranged with fourteen pockets; but it is obvious that a large mold-cylinder or a mold-cylinder with a large number of pockets may be used, in which case the endless apron has to be correspondingly enlarged, so as to keep the bunches for a sufficient length of time under pressure before they are delivered to the cigar-rolling mechanism.

The body of the mold-cylinder C is provided with four circumferential slits f, which are cut to uniform depth from its circumference inwardly and which serve for permitting the entrance of oscillating clearing-fingers F, that are attached to a pivot-shaft f', turning in bearings of the main standards of the frame. The fingers F are slightly curved at their lower ends and serve for transferring the bunches from the pockets at the outgoing side of the mold-cylinder onto a transverse shelf G, supported on an oscillating lever-arm G', as shown in Figs. 12 and 13. The oscillating motion of the fingers takes place simultaneously with the descending motion of the plunger, by which the bunch is transferred from the bunch-rolling mechanism into one of the pockets of the mold-cylinder. During the downward motion of the plunger projecting noses n of the plunger engage toes n' on the pivot-shaft of the fingers, as shown in Fig. 11, so as to oscillate thereby the fingers and remove the bunch from the pocket. In Fig. 12 the fingers are shown in position in the slits of the mold-cylinder ready for removing the bunch from the pocket as soon as the downward motion of the plunger P is completed. As soon as the noses n engage the toes n' the fingers are oscillated in forward direction, so as to remove the bunch to the shelf G. On the return of the plunger into its normally raised position the toes n' on the pivot-shaft are released, and the fingers are returned by gravity into their vertical position or by means of a suitable torsion-spring, as desired, so that they are in a position ready for transferring the next bunch on the next downward motion of the plunger.

*The cigar-rolling device.*—The curved forwardly-projecting rolling-table A⁴, on which the bunch is rolled into the wrapper so as to form a cigar, is covered in the same manner as the rolling-table of the bunch-rolling device with a surface covering I of carded leather, said table and covering being so concaved as to correspond to the shape of the cigar to be made on the machine. The shelf G is located near the rear end of the stationary cigar-rolling table A⁴ and provided with two mold-shaped depressions g, so as to receive the bunches from the mold-cylinder and deliver them one after the other onto the rolling-apron I' of the cigar-rolling mechanism. The rear end of the rolling-apron I' is attached to the front end of the shelf G and its front end to the front end of the rolling-table A⁴. The rolling-table A⁴ and carded covering I are curved at both sides, so that when the forked shelf-supporting end of the lever G' is passed alongside of the same the tension required for the proper shaping of the ends of the cigars is exerted by the rolling-apron during the forwardly-oscillating movement of the shelf-supporting lever. The curvature of the rolling-table and covering I is clearly shown in Fig. 5. The rolling-table is supported on a pin $a^4$ of the bracket-arms A⁵, so as to have some slight lateral motion, following the motion of the forked end of the oscillating shelf-lever. The forward motion of the oscillating lever G' moves the bunch delivered from the shelf G onto the rolling-apron into the bight of the same and rolls it in the well-known manner into the wrapper placed on the rolling-apron by the attendant. The rolling of the bunch into the wrapper is accomplished by the rolling-apron while the same is held between the rolling-table and an oscillating guide-plate I², that is pivoted to the standards of the supporting-frame near the pivot-shaft f' of the bunch-transferring fingers, said guide-plate being moved into raised position by suitable mechanism, as shown in full lines in Fig. 1, and lowered when the bunch is rolled into the wrapper in the position shown in dotted lines in Fig. 1 and in full lines in Fig. 12. The oscillating guide-plate I² is provided with a heel i near its pivot, said heel extending normally to the rear of the first depression on the shelf, so that when the guide-plate I² is returned into raised position the heel moves the bunch automatically onto the next depression on the shelf, while the bunch on the first depression is crowded over and dropped onto the wrapper on the rolling-apron. To the under side of the guide-plate I² are attached a number of light flat springs $i'$, which press by their free ends on the wrapper and hold it on the rolling-apron while the guide-plate I² descends into its lowered position on the apron. These springs are clearly shown in Figs. 1 and 12.

The mechanisms by which the reciprocating plunger P, as well as the oscillating guide-plate I², are operated are clearly shown in Figs. 1 and 15. These mechanisms consist of two connecting-rods $l$ and $m$, one being applied at its upper end to a laterally-extending pivot $l^2$ of the guide-plate I², while its lower end is provided with a shoulder $l^3$ and heel $l^4$, the heel moving over a cam $l^5$ on the auxiliary shaft S² until the shoulder $l^3$ is engaged by a pin $l^6$ on one of the radial arms of the motion-transmitting gear-wheel $w$, so that the guide-plate is held in raised position. As soon as the driving-shaft S is started the pin $l^6$ releases the shoulder $l^3$, so that the guide-plate I² begins to move in downward direction, while the heel moves along over the circumference of the cam and its hub in downward position until the shoulder $l^3$ is engaged by a second heel $l^7$, as shown in dotted lines in Fig. 1 and in full lines in Fig. 15, while the rolling of the cigar takes place. The second connecting-rod $m$ is likewise provided with a shoulder $m'$ and a heel $m^2$ at its lower end and is fulcrumed at its upper end to a lever P', pivoted to the upper portion of the standards $a\ a$, the opposite end of said lever engaging the plunger P by a ball-and-socket joint. The connecting-rod is operated by contact with a raised rim or flange $m^3$ on the circumference of the gear-wheel $w$ on the shaft S², the plunger being operated when the end of the rim $m^3$ engages the shoulder of the connecting-rod, so as to oscillate the lever P' and accomplish the downward motion of the plunger. When the shoulder $m'$ is released from the rim $m^3$, so that it moves again over the outer surface of the rim, the plunger-lever is released and the suspension-springs of the plunger return the same instantly into its normally raised position. Rotary motion is imparted to the gear-wheel $w$ on the shaft S² by a pinion $w'$ on the driving-shaft S.

The operation of my improved cigar-machine is as follows: The binder is placed on the yielding rolling-apron of the bunch-forming mechanism, after which the filler is placed on the binder after being compressed properly by the fingers of the right hand. The machine is then started by depressing a treadle, (not shown,) which releases a clutch on the driving-shaft, so that power is applied to the same. This produces the forward motion of the slide-plate of the bunch-rolling mechanism from the position shown in Fig. 12 to the position shown in Fig. 13, so that the filler is rolled into the binder by being rotated in the bight of the rolling-apron until the parts arrive in the position shown in Fig. 13. The bunch thus formed is then delivered from the bight by the turning of the disks and the connecting cross-bar of the same, to which the front end of the rolling-apron is attached. While the bunch is thus delivered from the rolling-apron, the reciprocating plunger is lowered by its actuating mechanism described, so that the bunch is forced into that pocket of the bunch-cylinder which is at the time vertically below the plunger. In descending the plunger passes through the opening in the rear part of the slide-plate of the bunch-rolling mechanism. The slide-plate is lifted during its forward motion by the inclined side guide-rails above the yielding rear end of the rolling-table by means of the lugs applied to the slide-block, so that the slide-block is permitted to pass over the rolling-table without interfering with the same, which would not be the case if the inclined side guide-rails were not provided for this purpose. The stop-block drops when the slide-plate arrives at its second position down on the stationary guide-block, to which the rolling-table is pivoted, being held in this position while the plunger descends and the bunch is transferred into the pocket of the bunch-cylinder. The reciprocating motion of the slide-plate is accomplished by the chain connection with the oscillating segments. (Shown in Fig. 1.) During the return motion of the slide-plate to its initial or starting position the mold-cylinder is rotated by its pawl-and-ratchet mechanism for the distance between two adjacent pockets, so that the next pocket comes vertically below the plunger, ready to receive the next bunch, which is formed by the bunch-rolling mechanism in the manner described. As the pockets are successively filled they are closed by the mold-sections of the endless mold-carrying apron and held under pressure in the mold formed by the pockets and mold-sections until nearly all the pockets are filled and one bunch after the other arrives in the path of the transferring-fingers. (Shown in Fig. 12.) The fingers are operated during the descent of the plunger and transfer the bunch to the first seat of the stationary shelf. When the next bunch is transferred to the shelf, the bunch already thereon is transferred to the second adjacent seat by the heel $i$ of the oscillatory guide-plate I², which action pushes off of the latter seat the bunch which may be thereon, and when the third bunch is transferred to the shelf it will occupy a position so that it can be pushed, as before, to the second seat, whereby the bunch previously pushed over thereby is transferred to the apron of the cigar-rolling mechanism. This transfer of bunch after bunch takes place at each full rotation of the driving-shaft—i. e., after each transfer of a bunch from the bunch-rolling table by the plunger into one of the pockets of the mold-cylinders. The wrapper, which has been cut out into proper shape by a suitable die in the usual manner, is placed on the cigar-rolling table and held thereon by the flat springs extending over the same, so that as soon as the bunch arrives on the apron the forward motion of the shelf commences, whereby the bunch is taken up by the bight of the apron and rolled into the wrapper between the yielding surface of the rolling-table and guide-plate, which latter has been lowered into position for rolling, as shown in dotted lines in Fig. 12. When the rolling action is completed, the cigar is delivered at the front end of the curved rolling-table of the cigar-rolling mechanism into a suitable receptacle. The tip of the cigar is finished by hand and the butt trimmed off in the usual manner in making cigars. The operation of the different actuating mechanism is so timed that they take place at the proper time, so that with each complete rotation of the driving-shaft all the parts are operated and a cigar is made. Each machine is intended to make one shape of cigar; but different sizes of the same can be made on the same machine. A number of machines are required for making different shapes. As the machine imitates closely the work of the human hand in the operation of making cigars, a cigar is obtained that resembles closely a hand-made cigar. One attendant is required for placing the binder and filler on the bunch-rolling table and the wrapper on the cigar-rolling table, in which case he stands sidewise of the machine, so as to properly attend to the same; but it is preferable to use one attendant for placing the binders and fillers on the bunch-rolling table and a boy at the opposite end placing the wrappers on the cigar-rolling table and remove the cigars as they are delivered by the cigar-rolling mechanism. All the cigars are uniform in shape, as the carded covering of the bunch and cigar-rolling table imitates the yielding pressure of the hand and hugs the bunch and cigar, respectively, so as to produce the required shape, so that machine-made cigars are obtained which have nearly almost the same quality as hand-made cigars, but at a considerable saving of time and labor as compared with the cost of hand-made cigars.

Having thus described my invention, I claim as new and desire to secure by Letters Patent—

1. The combination, with a bunch-rolling mechanism, of an intermittently-rotating mold-cylinder, an endless mold-carrying apron working in conjunction with the mold-cylinder, a delivery mechanism for transferring the bunches from the pockets of the mold-cylinder, an oscillating shelf for receiving said bunches, and a cigar-rolling mechanism to which the bunches are delivered from the shelf, substantially as set forth.

2. In a cigar-machine, the combination of a bunch-rolling mechanism, consisting of a stationary table having guideways, a pivoted and spring-cushioned bunch-rolling table, a reciprocating slide-plate, oscillating disks, an apron attached at its rear end to the front end of said slide-plate and at its opposite end to said oscillating disks, said slide-plate being provided with an opening, corresponding to the shape of the cigar, near its rear end, a vertically-reciprocating plunger passing through said opening, and an intermittently-rotating mold-cylinder having pockets that are placed vertically in line with said opening and plunger for receiving the bunch delivered by the bunch-rolling mechanism, substantially as set forth.

3. In a cigar-machine, a bunch-rolling mechanism consisting of a stationary table having guideways, a pivoted and spring-cushioned bunch-rolling table, a slide-plate guided in said ways, oscillating disks, an apron attached at its rear end to the slide-plate and at its front end to said oscillating disks, and mechanism for imparting reciprocating motion to said slide-plate for rolling the bunch and delivering the same at the end of the forward motion of the slide-plate, substantially as set forth.

4. In a cigar-machine, the combination, with a horizontal table having guideways, of a pivoted and yielding rolling-table, a reciprocating slide-plate guided in said ways, oscillating disks connected by a transverse bar, a rolling-apron attached at its rear end to the slide-plate and at its front end to said transverse bar carried by the oscillating disks, a vertically-guided stop-block guided in the rear end of the slide-plate and forming with the same an opening corresponding in shape to the bunch, said stop-block being provided with laterally-projecting lugs at its ends, inclined guide-rails on the guideways of the table for raising the stop-block so as to permit its passage over the rolling-table, and mechanism for reciprocating the slide-plate so as to produce the rolling of the bunch, substantially as set forth.

5. In a cigar-machine, the combination, with a horizontal table having guideways, of a pivoted and yielding rolling-table, a reciprocating slide-plate guided in said ways, oscillating disks connected by a transverse bar, a rolling-apron attached at its rear end to the slide-plate and at its front end to said transverse bar carried by the oscillating disks, a vertically-guided stop-block guided in the rear end of the slide-plate and forming with the same an opening corresponding in shape to the bunch, said stop-block being provided with laterally-projecting lugs at its ends, inclined guide-rails on the guideways of the table for raising the stop-block so as to permit its passage over the rolling-table, mechanism for reciprocating the slide-plate so as to produce the rolling of the bunch, a reciprocating plunger, a mold-cylinder for taking up the bunch on its delivery from the rolling mechanism, and a curved rearwardly-extending heel adapted to engage the lugs of the stop-block and bring the same in proper position relatively to the plunger, substantially as set forth.

6. The combination, with a bunch-rolling mechanism, of a mold-cylinder provided with a number of pockets, a stationary block vertically above the mold-cylinder and provided with an opening for the bunch, a reciprocating plunger adapted to transmit the bunch, when delivered by the bunch-rolling mechanism, into one of the molds of the mold-cylinder, an endless mold-carrying apron moving in contact with the pockets of the mold-cylinder for holding the bunches in position before delivering them to the cigar-rolling mechanism, means mounted outside of and independent of the mold-cylinder for clearing or removing the bunches from the same, and mechanism for imparting intermittent rotary motion to the mold-cylinder and apron, substantially as set forth.

7. In a cigar-machine, the combination of a bunch rolling and delivering mechanism, with an intermittently-rotating mold-cylinder having pockets for receiving the bunches, and an endless mold-carrying apron moving in conjunction with said mold-cylinder, said mold-cylinder being provided with circumferential slits, and oscillating clearing-fingers in said slits for delivering the bunches from the pockets of the mold-cylinder, substantially as set forth.

8. In a cigar-machine, the combination, with a bunch rolling and delivering mechanism, of an intermittently-rotating mold-cylinder, provided with a number of pockets, and a plurality of circumferential slits, an endless mold-carrying apron moving in conjunction with said mold-cylinder, means for guiding said apron so as to hold its mold-sections in contact with the pockets of the mold-cylinder, oscillating clearing-fingers moving in the radial slits of the mold-cylinder, a vertically-reciprocating plunger for transmitting the bunches into the pockets of the cylinder, and means between said plunger and the oscillating fingers for operating the same on the descent of the plunger, so as to deliver the bunches successively from the pockets of the mold-cylinder, substantially as set forth.

9. In a cigar-machine, the combination, with an intermittently-rotating mold-cylinder having pockets for receiving the bunches, and a plurality of circumferential slits, of an endless mold-carrying apron moving in conjunction with said cylinder, means for guiding the same for bringing the molds in contact with the lower part of the mold-cylinder, oscillating clearing-fingers moving in the radial slits of the mold-cylinder for delivering the bunches from the mold-cylinder, and a shelf provided with seats for receiving the bunches, and means for oscillating said shelf for delivering one bunch after the other to the rolling mechanism, substantially as set forth.

10. In a cigar-machine, a cigar-rolling mechanism consisting of a rolling-table, a rolling-apron extending over the same, the front end of said apron being attached to the outer end of the rolling-table, an oscillating delivery-shelf to which the rear end of the rolling-apron is attached, a guard-plate, and means for oscillating said guard-plate so as to place it in position over the rolling-table, substantially as set forth.

11. In a cigar-machine, a cigar-rolling mechanism consisting of a laterally-shiftable rolling-table, a rolling-apron extending over the same, an intermediate carded layer between the table and apron, an oscillating shelf, said rolling-apron being attached at its rear end to the shelf and at its front end to said table, means for oscillating the shelf so as to roll the bunch into the wrapper, and an oscillating guard-plate placed in position over the rolling-table when the rolling action takes place, substantially as set forth.

12. In a cigar-machine, a cigar-rolling mechanism, consisting of a rolling-table, a rolling-apron extending over the same, an oscillating shelf, said rolling-apron being attached at its front end to the rolling-table and at its rear end to the shelf, means for oscillating said shelf, for rolling the bunch into the wrapper, an oscillating guard-plate adapted to be placed in position over the rolling-table for rolling the bunch into the wrapper, and leaf-springs attached to said guard-plate for holding the wrapper in position while the bunch is delivered into the same, substantially as set forth.

In testimony that I claim the foregoing as my invention I have signed my name in presence of two subscribing witnesses.

HANS A. SCHNEEKLOTH.

Witnesses:
JOSEPH H. NILES,
GEORGE C. GEIBEL.